US010085253B2

(12) United States Patent
Murphy et al.

(10) Patent No.: US 10,085,253 B2
(45) Date of Patent: Sep. 25, 2018

(54) METHODS AND APPARATUS FOR CONTROLLING WIRELESS ACCESS POINTS

(71) Applicant: Juniper Networks, Inc., Sunnyvale, CA (US)

(72) Inventors: James Murphy, Alameda, CA (US); Sandip Shah, Milpitas, CA (US); Abhijit Choudhury, Cupertino, CA (US); Pranay Pogde, Sunnyvale, CA (US); Yung-Ching Tseng, Los Gatos, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 0 days.

(21) Appl. No.: 15/470,510

(22) Filed: Mar. 27, 2017

(65) Prior Publication Data

US 2017/0201979 A1    Jul. 13, 2017

Related U.S. Application Data

(62) Division of application No. 14/978,805, filed on Dec. 22, 2015, now Pat. No. 9,635,663, which is a division
(Continued)

(51) Int. Cl.
*H04W 4/00* (2018.01)
*H04W 72/04* (2009.01)
(Continued)

(52) U.S. Cl.
CPC ........ *H04W 72/0433* (2013.01); *H04L 5/0055* (2013.01); *H04L 63/10* (2013.01);
(Continued)

(58) Field of Classification Search
CPC ........ H04W 80/04; H04W 8/26; H04L 12/56; H04L 2012/56; H04L 47/10; H04L 47/30;
(Continued)

(56) References Cited

U.S. PATENT DOCUMENTS 5,379,278 A    1/1995  Safadi
5,812,531 A    9/1998  Cheung et al.
(Continued)

FOREIGN PATENT DOCUMENTS

CN    1390035          1/2003
CN    1689348 A        10/2005
(Continued)

OTHER PUBLICATIONS

Nick McKeown, et al. "OpenFlow: Enabling Innovation in Campus Networks", Mar. 14, 2008.
(Continued)

*Primary Examiner* — Brenda H Pham
(74) *Attorney, Agent, or Firm* — Cooley LLP

(57) ABSTRACT

In some embodiments, an apparatus comprises of a first Control And Provisioning of Wireless Access Points (CAPWAP) module implemented in at least one of a memory or a processing device that is configured to be designated as a backup control module for a wireless access point during a first time period. The first CAPWAP control module is configured to receive state information associated with the wireless access point during the first time period from a second CAPWAP control module. The second CAPWAP control module is designated as a primary control module for the wireless access point during the first time period. The first CAPWAP control module is configured to be automatically designated as the primary control module during a second time period after the first time period and in response
(Continued)

to the second CAPWAP control module not operating according to at least one predefined criterion.

9 Claims, 6 Drawing Sheets

Related U.S. Application Data of application No. 13/630,470, filed on Sep. 28, 2012, now Pat. No. 9,231,820.

(51) Int. Cl.

| | |
|---|---|
| *H04L 5/00* | (2006.01) |
| *H04W 48/16* | (2009.01) |
| *H04L 29/06* | (2006.01) |
| *H04W 12/08* | (2009.01) |
| *H04W 88/12* | (2009.01) |
| *H04W 80/06* | (2009.01) |
| *H04W 88/08* | (2009.01) |

(52) U.S. Cl.
CPC ........... *H04L 63/166* (2013.01); *H04W 12/08* (2013.01); *H04W 48/16* (2013.01); *H04W 80/06* (2013.01); *H04W 88/08* (2013.01); *H04W 88/12* (2013.01)

(58) Field of Classification Search
CPC . H04L 47/11; H04L 47/12; H04L 2012/5631; H04L 47/15; H04L 47/2441; H04L 47/70
USPC ........ 370/349, 389, 229, 230, 235, 252, 253
See application file for complete search history.

(56) References Cited

U.S. PATENT DOCUMENTS

| | | | |
|---|---|---|---|
| 6,094,436 | A | 7/2000 | Runaldue et al. |
| 6,219,546 | B1 | 4/2001 | Valentine et al. |
| 8,036,172 | B1 | 10/2011 | Breau |
| 8,264,947 | B1 | 9/2012 | Tavares |
| 9,357,410 | B2 | 5/2016 | Nedeltchev |
| 2002/0110105 | A1 | 8/2002 | Awater et al. |
| 2003/0139197 | A1 | 7/2003 | Zoran et al. |
| 2003/0154431 | A1 | 8/2003 | Lin et al. |
| 2003/0174690 | A1 | 9/2003 | Benveniste |
| 2004/0052248 | A1 | 3/2004 | Frank et al. |
| 2004/0081140 | A1 | 4/2004 | Martin |
| 2006/0056448 | A1 | 3/2006 | Zaki et al. |
| 2007/0064673 | A1 | 3/2007 | Bhandaru et al. |
| 2007/0116020 | A1 | 5/2007 | Cheever et al. |
| 2007/0220553 | A1 | 9/2007 | Branam |
| 2007/0253328 | A1 | 11/2007 | Harper et al. |
| 2008/0025210 | A1* | 1/2008 | Honary ............... H04L 47/10 370/229 |
| 2008/0162981 | A1 | 7/2008 | Jajoo et al. |
| 2008/0225853 | A1 | 9/2008 | Melman et al. |
| 2008/0304485 | A1* | 12/2008 | Sinha .................. H04L 12/66 370/392 |
| 2009/0034470 | A1 | 2/2009 | Nagarajan |
| 2010/0191971 | A1* | 7/2010 | Bajic .................. H04L 9/0844 713/171 |
| 2010/0220656 | A1 | 9/2010 | Ramankutty et al. |
| 2010/0246545 | A1 | 9/2010 | Berzin |
| 2011/0235505 | A1 | 9/2011 | Eswara et al. |
| 2011/0319073 | A1 | 12/2011 | Ekici |
| 2012/0106320 | A1 | 5/2012 | Moisiadis et al. |
| 2012/0236708 | A1 | 9/2012 | Kompella et al. |
| 2012/0287774 | A1 | 11/2012 | Hinkle et al. |
| 2013/0083724 | A1 | 4/2013 | Sindhu et al. |
| 2013/0343178 | A1 | 12/2013 | Ankaiah et al. |
| 2014/0006481 | A1 | 1/2014 | Frey et al. |
| 2014/0092723 | A1 | 4/2014 | Murphy et al. |
| 2014/0092884 | A1 | 4/2014 | Murphy et al. |

FOREIGN PATENT DOCUMENTS

| | | |
|---|---|---|
| CN | 101051981 A | 10/2007 |
| CN | 102143604 | 8/2011 |
| CN | 102439914 A | 5/2012 |
| EP | 1 777 893 | 4/2007 |
| EP | 2725829 | 4/2014 |
| WO | WO 0251078 | 6/2002 |
| WO | WO 2004/028175 | 4/2004 |
| WO | WO 2009/158263 | 12/2009 |

OTHER PUBLICATIONS

HiveManager, "My HiveAPs are connected by CAPWAP, but why is their connection status shown as disconnected?" Retrieved from the Internet, https://faq.aerohive.com/index.php?action=artikel&cat=3&id=348&artlang=en, Nov. 23, 2010, 1 page.

Enterprise Mobility 4.1 Design Guide, "Cisco Unified Wireless QoS", Cisco Systems, Inc. Dec. 9, 2008, Chapter 5, pp. 5-1-5-32.

Jason Edelman (gedelman8), "CAPWAP and OpenFlow—thinking outside the box", Retrieved from the Internet, http://www.jedelman.com/1/post/2011/12/capwap-and-openflow-thinking-outside-the-box.html, Nov. 30, 2011, 3 pages.

Muhammad Arif Amin, "Handover Latency Measurement using Variant of Capwap Protocol", Macrothink Institute, Network Protocols and Algorithms, ISSN 1943-3581, vol. 3, No. 2. (2011).

Michael Montemurro, "RE: Multiple/Redundant AC's (was: Re: [Capwap] Additional Comment on LWAPP)", Retrieved from the internet, http://lists.frascone.com/pipermail/capwap/msg02197.html. Jan. 25, 2006, 3 pages.

George C. Hadjichristofi, et al. "A Wired-Wireless Testbed Architecture for Network Layer Experimentation Based on ORBIT and VINI", WiNTECH '07, Sep. 10, 2007. pp. 83-90.

Partial European Search report dated Apr. 3, 2014 for European Application No. 13165000.4-1854, 6 pages.

Extended European Search Report dated Jun. 20, 2014 for European application No. 13165000, 11 pages.

Extended EP Search Report dated Oct. 10, 2014 for European Application No. 13165614.

Calhoun, Editor, et al., "CAPWAP Protocol Specification draft-ietf-capwap-protocol-specification-09," IETF Network Working Group, Internet-Draft, Feb. 21, 2008.

P. Calhoun, et al., Control and Provisioning of Wireless Access Points (CAPWAP) Protocol Specification, Network Working Group, RFC 5415, Mar. 2009. pp. 1-155.

L. Yang, et al., Architecture Taxonomy for Control and Provisioning of Wireless Access Points (CAPWAP), Network Working Group, RFC 4118, Jun. 2005, pp. 1-41.

Chinese Office Action dated May 24, 2016 for Chinese Application No. 2013101636236.

Chinese Office Action including Search Report dated Jul. 6, 2016 for Chinese Application No. 201310159620.5.

Chinese Office Action dated Feb. 13, 2017 for Chinese Application No. 2013101636236.

U.S. Office Action dated Jun. 28, 2016 for U.S. Appl. No. 14/978,805.
U.S. Office Action dated May 7, 2014 for U.S. Appl. No. 13/630,470.
U.S. Office Action dated Aug. 25, 2014 for U.S. Appl. No. 13/630,470.
U.S. Office Action dated Mar. 11, 2015 for U.S. Appl. No. 13/630,488.
U.S. Final Office Action dated Oct. 8, 2015 for U.S. Appl. No. 13/630,488.
U.S. Office Action dated Apr. 7, 2016 for U.S. Appl. No. 13/630,488.

\* cited by examiner

METHODS AND APPARATUS FOR CONTROLLING WIRELESS ACCESS POINTS

CROSS-REFERENCE TO RELATED APPLICATIONS

This application is a divisional of U.S. patent application Ser. No. 14/978,805, (now U.S. Pat. No. 9,635,663), filed on Dec. 22, 2015, and entitled "Methods and Apparatus for Controlling Wireless Access Points," which is a divisional of U.S. patent application Ser. No. 13/630,470, filed on Sep. 28, 2012, and entitled "Methods and Apparatus for Controlling Wireless Access Points," now U.S. Pat. No. 9,231,820, each of which is incorporated herein by reference in its entirety.

This application is related to U.S. patent application Ser. No. 13/630,488, now U.S. Pat. No. 9,674,030), filed on Sep. 28, 2012, and entitled "Methods and Apparatus for a Common Control Protocol for Wired and Wireless Nodes," which is incorporated herein by reference in its entirety.

BACKGROUND

Some embodiments described herein relate generally to enhancing the performance, robustness, extensibility, and Quality of Service (QoS) of the Control and Provisioning of Wireless Access Points (CAPWAP) protocol. In particular, but not by way of limitation, some of the embodiments described herein relate to methods and apparatus for allowing CAPWAP to use Transport Control Protocol (TCP) as the transport protocol for control plane signaling. Additionally, in particular, some of the embodiments described herein relate to methods and apparatus for using primary and secondary CAPWAP controllers for managing the network sessions of wireless access points.

CAPWAP specifies using User Datagram Protocol (UDP) as the transport protocol for control plane signaling. As a result, known applications typically implement complex retry and back-off mechanisms, and message delivery from a source device to a destination device is not guaranteed. Additionally in most enterprise networks employing CAPWAP, wireless access points are generally controlled or managed by a single CAPWAP controller. This involves the risk of loss of network sessions between a CAPWAP controller and a wireless access point if the CAPWAP controller fails.

Accordingly, a need exists for a more robust implementation of the CAPWAP protocol and to develop methods to reduce the risk of lost network sessions in case of failure of a CAPWAP controller.

SUMMARY

In some embodiments, an apparatus comprises of a first Control And Provisioning of Wireless Access Points (CAPWAP) module implemented in at least one of a memory or a processing device that is configured to be designated as a backup control module for a wireless access point during a first time period. The first CAPWAP control module is configured to receive state information associated with the wireless access point during the first time period from a second CAPWAP control module. The second CAPWAP control module is designated as a primary control module for the wireless access point during the first time period. The first CAPWAP control module is configured to be automatically designated as the primary control module during a second time period after the first time period and in response to the second CAPWAP control module not operating according to at least one predefined criterion.

DETAILED DESCRIPTION

Figure 1:
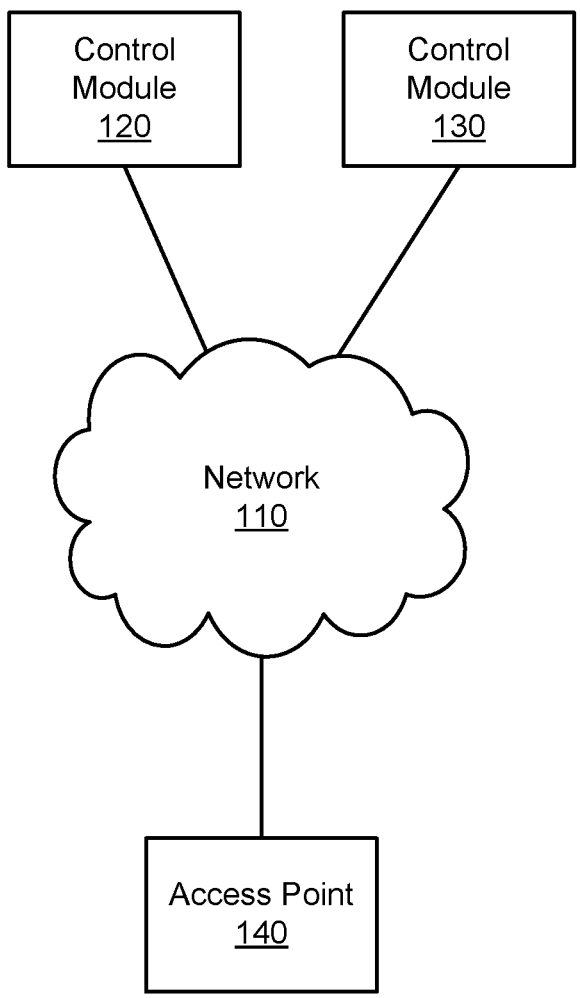
FIG. 1 is a schematic illustration of a system for controlling wireless access points, according to an embodiment.

In some embodiments, an apparatus comprises of a first Control And Provisioning of Wireless Access Points (CAPWAP) module implemented in at least one of a memory or a processing device that is configured to be designated as a backup control module for a wireless access point during a first time period. The first CAPWAP control module is configured to receive during the first time period, state information associated with the wireless access point from a second CAPWAP control module that is designated as the primary control module for the wireless access point during the first time period. The first CAPWAP control module is also configured to receive during the first time period, state information associated with a second CAPWAP control module from the second CAPWAP control module. The first CAPWAP control module is configured to be automatically designated as the primary control module for the wireless access point during a second time period after the first time period and in response to the second CAPWAP control module not operating according to at least one predefined criterion.

In some embodiments, a non-transitory processor-readable medium includes code representing instructions to cause a processor to send a first CAPWAP control packet to a CAPWAP controller using a Transport Control Protocol (TCP) at a first time. The code causes the processor to activate a TCP timer based on sending the first CAPWAP control packet. The code also causes the processor to send using TCP a second CAPWAP control packet to the CAPWAP controller after the first time and before a second time. The code further causes the processor to receive using TCP at a second time, a response to the first CAPWAP control packet (e.g., a TCP acknowledgement signal), and suspend the TCP timer in response to receiving the response to the first CAPWAP control packet such that the TCP timer provides an indication of a duration of time between the first time and the second time.

In some embodiments, an apparatus comprises of a CAPWAP control module implemented in at least one of a memory or a processing device that is configured to receive a first control packet from a wireless access point via a first channel having a first priority. The CAPWAP control module is configured to receive a second control packet from the wireless access point via a second channel having a second priority that is different than the first priority. The CAPWAP control module is configured to send, in response to the first control packet, a third control packet to the wireless access point via a first channel such that the wireless access point receives the third control packet within a period of time after the first control packet is sent. The CAPWAP control module is configured to send, in response to the second control packet, a fourth control packet to the wireless access point via the second channel such that the wireless access point receives the fourth control packet within a period of time after the fourth control packet is sent. The period of time after the third control packet is sent is shorter than the period of time after the fourth control packet is sent based on the first channel having the first priority and the second channel having the second priority.

As used in this specification, the singular forms "a," "an" and "the" include plural referents unless the context clearly dictates otherwise. Thus, for example, the term "an access point" is intended to mean a single access point or a combination of access points.

FIG. 1 is a schematic illustration of a system for controlling wireless access points, according to an embodiment. The system 100 comprises of a first control module 120, a second control module 130, a network 110, and an access point 140.

The network 110 can be any type of network (e.g., a local area network (LAN), a wide area network (WAN), a virtual network, or a telecommunications network) implemented as a wired network and/or wireless network. As described in further detail herein, in some embodiments, for example, the access point 140 can be connected to the first control module 120 and the second control module 130 via an intranet, an Internet Service Provider (ISP) and the Internet, a cellular network (e.g., network 110), and/or the like.

The access point 140 can be any device that connects a wireless client device to a wired network 110 using, for example, Wi-Fi, Bluetooth or other wireless communication standards. In some cases, the access point 140 can be located on the same device together with an access network node (not shown in FIG. 1), such as a wireless Ethernet router equipped with a wireless transceiver. In other cases, the access point 140 can be a stand-alone device, such as a wireless access point (WAP). A wireless client device can be, for example, any device that can receive packets from and/or send packets to an access point 140 through a wireless connection, such as, for example, a mobile phone, a Wi-Fi enabled laptop, a Bluetooth earphone, etc.

The control modules 120 and 130 each can be a hardware module or a software module(s) implemented in at least one of a memory or a processing device (e.g., stored in memory, executing on a processor, implemented in firmware of a processing device, etc.). For example, control modules 120 and 130 can be a server, a workstation, a desktop computer, a laptop computer, and/or so forth. The control modules 120 and 130 can each be, for example, a Control and Provisioning of Wireless Access Points (CAPWAP) access controller(s) (AC) or a CAPWAP control module(s) that can manage a collection of access points 140 (i.e., Wireless Termination Points) in an enterprise network.

The first control module 120 can be configured to be designated as a backup control module for the (wireless) access point 140 during a first time period. The first control module 120 can be configured to receive state information associated with the second control module 130 during a first time period. The first control module 120 can also be configured to receive state information associated with the access point 140 from the second control module 130 during the first time period. During this first time period, the second control module 130 can be designated as a primary control module for the access point 140. In some embodiments, the second control module 130 can receive the state information directly from the access point 140. For example, the access point 140 can address the state information to the second control module 130 such that the network 110 routes and/or switches the state information to the second control module 130. In other embodiments, the state information can be addressed to one or more intervening nodes prior to reaching the second control module 130. Alternatively, in still other embodiments, the first control module can also be configured to receive state information associated with the access point 140 directly from the access point 140 during the first time period. The first control module 120 can be configured to be automatically designated as the primary control module during a second time period after the first time period if the second control module 130 is not operating according to at least one predefined criterion.

Specifically, in some instances, the first (CAPWAP) control module 120 can receive from the wireless access point 140, a notification signal that the second (CAPWAP) control module 130 is not operating according to at least one predefined criterion. An example of a predefined criterion can be the number of link failures for a network session with the wireless access point 140 exceeding a predetermined number in a specified time period. In such instances, the first (CAPWAP) control module 120 is configured to be automatically designated as the primary control module to manage and operate the (wireless) access point 140 in response to the notification signal.

In other instances, the first CAPWAP control module 120 and the second CAPWAP control module 130 can be configured to exchange one or multiple "keep alive" messages. The "keep alive" messages (or signals) can be exchanged between first CAPWAP control module 120 and the second CAPWAP control module 130, for example, at pre-determined time intervals. Such "keep alive" messages can include the source device internet protocol (IP) address, destination device IP address, a request configuration message portion, a configuration status message portion, and/or so forth. In such embodiments, the first CAPWAP control module 120 is configured to be automatically designated as the primary control module for the access point 140, if the first CAPWAP control module 120 does not receive a "keep alive" message from the second CAPWAP control module 130 within a predetermined time interval.

In some instances, when the first CAPWAP control module 120 is designated as the primary control module for the wireless access point 140 during the second time period, the first CAPWAP control module 120 can be configured to exchange, during the second time period, CAPWAP control signals with the wireless access point 140 based on state information as described herein. Such CAPWAP control signals can include, for example, control packets associated with at least one of session management, image management, statistic collection feature, logging feature, and/or the like. Such CAPWAP control signals can include, for example, a CAPWAP header portion specific to a type of the control packet and not specific to a CAPWAP binding. In some embodiments, the first CAPWAP control module 120 can also be configured to send a signal to establish a Transport Control Protocol (TCP) session with the wireless access point 140 during the second time period.

The primary control module for the wireless access point 140 (which can be the first CAPWAP control module 120 or the second CAPWAP control module 130) can be configured to receive a first control packet from a wireless access point 140 via a first channel having a first priority. The first control packet can be at least one of a session management packet, an image management packet, a statistic collection packet, or a logging packet, and/or so forth. Note that the different types of control packets described above are only examples of functions that can be performed by control packets and are not an exhaustive list of the different functions that can be performed by control packets. The first channel can be, for example, a CAPWAP control channel and can include at least one of a session management channel, an image management channel, a statistic collection channel, or a logging channel that may or may not support the transmission of encrypted control packets. Note that the control channels described above are only examples of control channels that can be established between a (CAPWAP) control module 120 and/or 130 and an access point 140, and are not an exhaustive list. The primary control module for the wireless access point 140 can also be configured to receive a second control packet from the wireless access point 140 via a second channel having a second priority different than the first priority. In some embodiments, the first channel and/or the second channel each can be a tunnel (e.g., a multiprotocol label switching (MPLS) tunnel or an Ethernet-over-layer-3 tunnel such as a CAPWAP tunnel) encapsulates control packets and/or data packets passing through the channel. In other embodiments, the first channel and/or the second channel may not be a tunnel, and control packets can pass through the channel by switching or other mechanisms as dictated by local policy. Control packets passing through the first channel and/or the second channel may or may not be encrypted. In some embodiments, data packets can be transmitted through separate data channels (e.g., CAPWAP data channels).

The primary control module can be configured to send, in response to receiving the first control packet, a third control packet to the wireless access point 140 via the first channel such that the wireless access point 140 receives the third control packet within a period of time after the first control packet is sent. The third control packet can be based on a type of the first control packet. For example, if the first control packet is sent though a tunnel and is encapsulated according to a specific tunneling protocol, then the third control packet is also an encapsulated control packet sent though the first channel (which in this example is a tunnel). In such instances, the primary control module can also be configured to send, in response to receiving the second control packet, a fourth control packet to the wireless access point 140 via the second channel such that the wireless access point 140 receives the fourth control packet within a period of time after the fourth control packet is sent. The fourth control packet can also be based on a type of the second control packet as described above. In such instances, the time interval between the first and third control packets is smaller than the time interval between the second and fourth control packets if the first channel has a higher priority than the second channel (and vice-versa).

Known uses of CAPWAP assumes a one-to-one relationship between a control module 120 or 130 (CAPWAP controller) and the access point 140. In the event that the control module 120 or 130 fails during a network session, the access point 140 will also fail. By using two control modules 120 and 130 (a primary controller and a backup controller) to manage the operation of an access point 140, if one control module 120 or 130 fails, the backup control module 120 or 130 can take over the operation. This can allow the access point 140 to continue serving wireless client devices in the event of control module failure.

Figure 2:
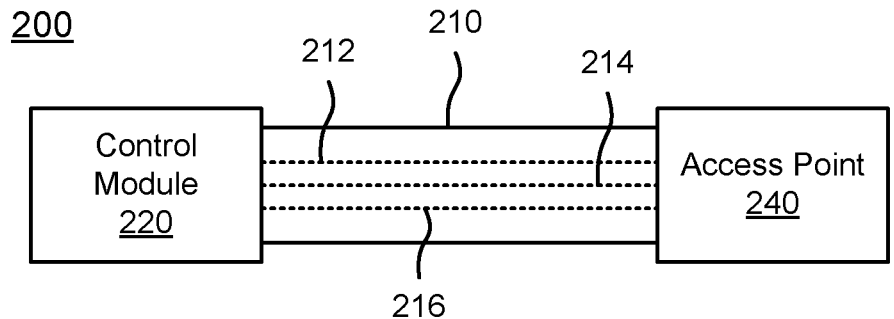
FIG. 2 is a block diagram of a system of communication between a control module and an access point that includes a communication link containing various control channels, according to an embodiment.

FIG. 2 is a block diagram of a system of communication between a control module and an access point that includes a communication link containing various control channels, according to an embodiment. The system 200 includes a control module 220, an access point 240, a communication link 210, and control channels 212, 214 and 216. The communication link 210 is a logical entity that can define a pathway for communication between the control module 220 and the access point 240. Physically, the communication link 210 can pass through any number of network nodes and access devices such as, for example, core network nodes, aggregation network nodes, access network nodes, other forms of routing and switching devices, and/or the like. The communication link 210 can be comprised of one or multiple control channels such as the control channels 212-216. The control channels 212-216 can include, for example, session management channel(s), image management channel(s), statistic collection channel(s), logging channels(s), and/or the like. In some embodiments, the communication link 210 can also include a data channel that runs over User Datagram Protocol (UDP) (not shown in FIG. 2). In such embodiments, the UDP data channel can be used to exchange client traffic (e.g., data packets associated with an access point) between the access point 240 and the control module 220.

The session management channel 212 can pass control (and data) packets between the control module 220 and the access point 240 that are associated with establishing, maintaining, and terminating a communication session between the control module 220 and a wireless client device such as a laptop enabled with Wireless Fidelity (Wi-Fi) capability, a mobile phone, a tablet computing device, and/or the like. Communication sessions between the control module 220 and a wireless client device can include, for example, authentication signals such as, for example, 802.1X authentication request signals, 802.1X authentication response signals, Transmission Control Protocol (TCP) sessions for Transport Layer Security (TLS) or Wireless Internet Service Provider roaming (WISPr) based authentication, and/or the like.

Control packets passing through a session management channel 212 can each include, for example, a unique session identifier, an identifier associated with the port of the access point 240 that is operatively coupled to the control module 220, information about a user (of the wireless client device involved in a session) preferences, user authorization (or clearance) level, a time log of the session, the IP address of the client device (associated with a user), the IP address of the access point 240 operatively coupled to the wireless client device, an HTTP session token (or a session cookie), and/or the like. Control (and data) packets passing through the session management channel 212 may or may not be encrypted.

The image management channel 214 can pass control packets between the control module 220 and the access point 240 such as, for example, control packets associated with the version of the software being used by the access point 240, control packets associated with new software(s) to be installed in the access point 240, data encryption/decryption capabilities of the access point 240, an identifier associated with the different tunneling protocols supported by the access point 240, and/or so forth. In some instances, the image management channel 214 can also pass data packets that can be sent from the control module 220 to the access point 240 via for example, a CAPWAP tunnel.

The statistic collection channel 216 can pass control packets and data packets that are associated with information regarding different kinds of parameters associated with a communication session. Examples of control packets and/or data packets passing through the statistic collection channel 216 can include periodic signals reporting on the quality of service (QoS) of the wireless connection (or link) between the access point 240 and the wireless client device; the number of wireless client devices connected to the access point 240 at any given time; the number of times a wireless link between the access point 240 and the wireless client device fails due to, for example, software failure, hardware failure, unknown causes, etc.; the number of time a user logs in though a wireless client device into the enterprise network; control packet and/or data packet upload and download speeds from the access point 240 to the wireless client device; and/or the like.

As mentioned above, the control packets passing though one or more of the above mentioned control channels 212-216 may or may not require encryption for increased security. Additionally, the different channels can have different priority levels. For example, the session management channel 212 and the image management channel 214 can have increased priority over the statistic collection channel 216. This is because control packets passing through the session management channel 212 and the image management channel 214 are used for the establishment and maintenance of a communication session between the control module 220 and a wireless client device, whereas the contents of the statistic collection channel 216 can be exchanged at a later time after the termination of the communication session. Additionally, the QoS requirements of the channels 212-216 can vary depending on the bandwidth used to transfer control and data packets through the channels 212-216. For example, in some embodiments, the session management channel 212 and the image management channel 214 may require higher QoS because of the increased volume and the larger size of the control and data packets sent through these channels such as, for example, software updates, new software executable files, and/or the like. The statistic management channel 216 on the other hand, may not require a high QoS because the packets passing through the statistic management channel 216 mainly contain logging and tracking information.

The (CAPWAP) control module 220 can receive a first control packet from the (wireless) access point 240 via a first channel (any of the channels 212-214) having a first priority, and a second control packet from the access point 240 via a second channel (any of the channels 212-214) having a second priority that is different than the first priority. The control module 220 can be configured to send, in response to the first control packet, a third control packet to the access point 240 via the first channel such that the access point 240 receives the third control packet within a period of time after the third control packet is sent. The control module 220 can also be configured to send, in response to the second control packet, a fourth control packet to the access point 240 via the second channel such that the access point 240 receives the fourth control packet within a period of time after the fourth control packet is sent. In such embodiments, the time interval between the first control packet being sent and the third control packet being received by the access point 240 is less than the time interval between the second control packet being sent and the fourth control packet being received by the access point 240, if the first channel has a higher priority than the second channel.

The first control packet can be, for example, at least one of a session management packet, an image management packet, a statistic collection packet, or a logging packet as described above. In such embodiments, the first channel can be at least one of a session management channel, an image management channel, a statistic collection channel, or a logging channel as described above. The control module 220 is configured to send the third control packet via the first channel based on a type of the first control packet. The control module 220 is also configured to send the fourth control packet via the second channel based on a type of the second control packet.

In some instances, the first control packet may be an encrypted control packet (a first type) and the second control packet may not be encrypted (a second type). In such instances, the control module 220 can be configured to encrypt the third control packet based on the third control packet being associated with a first type and prior to sending the third control packet to the wireless access point 240. The control module 220 can also be configured to not encrypt the fourth control packet based on the fourth control packet being associated with a second type different than the first type. Additionally, the control module 220 can also be configured to determine at least one parameter associated with the (wireless) access point 240 based at least in part on the first control packet or the second control packet, and the control module 220 can be configured to process a data packet based on the parameter.

Known implementations of CAPWAP aggregates all messages (packets) exchanged between a control module 220 and an access point 240 into a single connection or channel with a window size of one. This connection can get congested with bulk statistic and configuration information that can delay processing of real time network management packets (real time session processing information). The use of multiple control channels, as described in FIG. 2 where each channel is associated with its own class of service, can separate real time (network) management control from low priority bulk transactions. Each control channel 212-216 can be implemented, for example, by a separate TCP connection.

Figure 3:
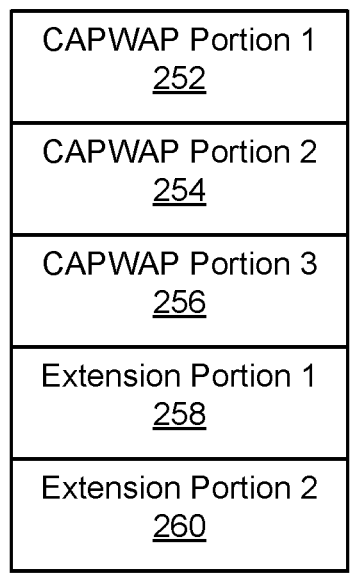
FIG. 3 is a block diagram of a CAPWAP control packet that includes multiple CAPWAP portions and extension portions that can extend the CAPWAP protocol binding, according to an embodiment.

FIG. 3 is a block diagram of a CAPWAP control packet that includes multiple CAPWAP portions and extension portions that can extend the CAPWAP protocol binding, according to an embodiment. The CAPWAP control packet 250 includes CAPWAP portions 252, 254, 256 and extension portions 258 and 260. The extension portions 258 and 260 can be added to existing CAPWAP control packets, for example, via an extensibility scheme that can use vendor specific identifiers to extend an existing message space. Modification of existing CAPWAP portions and/or the inclusion of extension portions as shown in FIG. 3 can be achieved through the use of various software tools such as, for example, Google Protocol Buffers (protobufs). Protobufs allow CAPWAP messages to be extended (or changed) in a backward compatible manner, thereby enabling binding protocol extensions without requiring older protocol applications to upgrade the protocol implementation. Such CAPWAP control packets 250 that include extension portions 258 and 260 can include a CAPWAP header portion specific to a type of the control packet without defining or being specific to a new CAPWAP binding.

The CAPWAP portions 252, 254, and 256 can be portions included in a CAPWAP control packet defined, for example, by using Transport Control Protocol (TCP). The CAPWAP portions 252, 254, and 256 can be for example, a CAPWAP discovery request/response message and/or a CAPWAP configuration status request/response message. The CAPWAP control portions 252, 254, and 256 can include, for example, an access point identifier, a CAPWAP access controller identifier, a CAPWAP access controller status descriptor, a list of the CAPWAP protocol bindings supported by an access point, a list of the various tunneling protocols supported by the access point, the number of wireless client devices connected to an access point, the download/upload speed for data passing through a specific port in an access point, an access point reboot statistics, and/or the like.

The extension portions 258 and 260 can be portions that can add new features to an existing CAPWAP protocol binding, thereby extending the CAPWAP protocol binding. In some embodiments, the extension portions 258 and 260 can be portions defined as a result of, for example, using Transport Control Protocol (TCP). Typically, User Datagram Protocol (UDP) is used as the transport protocol in CAPWAP network sessions. UDP uses a transmission model with a small number of protocol mechanisms. UDP typically has no handshaking dialogues, and thus exposes any unreliability of the underlying network protocol to the user's program. Hence, message delivery or protection from data duplication is not guaranteed. UDP is suitable for purposes where handshaking and/or guaranteed message delivery is either not necessary or performed in the application, thus avoiding the overhead of such processing at the network interface level. Time-sensitive applications often use UDP because dropping packets is preferable to waiting for delayed packets (which may not be an option in a real-time system). Use of TCP, however, can add more capabilities to an existing CAPWAP protocol because TCP has well defined retry and backoff mechanisms. Additionally, TCP also has more features than UDP such as, for example, built in timers, guarantee of message delivery, capability for outgoing messages to be stacked, capability for handling order when dealing with incoming messages, use of Transport Layer Security (TLS) (which is a robust and widely used technology) to provide communication security over the internet, and/or the like. Thus, the extension portions 258 and 260 can be used to include certain TCP based functionality.

CAPWAP traditionally uses a window size of one. This can limit the CAPWAP exchange to a single outstanding request message and can limit the number of messages processed per unit time to a function of the round trip time between the CAPWAP controller (control module) and the access point. The use of TCP as the transport protocol for sending messages allows stacking of multiple messages. Hence, use of TCP allows a window of arbitrary size (multiple messages). This allows for multiple request messages to be processed immediately one after the other, which can be critically important when dealing with multiple (network) sessions simultaneously.

The extension portions 258 and 260 can include, for example, an identifier indicating the control module designated as the primary control module for a wireless access point, an identifier indicating the control module designated as the backup control module for a wireless access point, a portion denoting a class of service for a CAPWAP message as described in detail in FIG. 2 (network management control message, image management control message, etc.).

The extension portions 258 and 260 can also include, for example, a portion denoting a new flag associated with using the TCP protocol, a power-over-Ethernet capability for a port of an access network node (in case of CAPWAP protocol bindings that extends to wired communications as described in detail in U.S. patent application Ser. No. 13/630,488, filed on the same date herewith, and entitled "Methods and Apparatus for a Common Control Protocol for Wired and Wireless Nodes," which is incorporated herein by reference in its entirety), and/or the like.

The CAPWAP control packet 250 including the CAPWAP portions 252-256 and the extension portions 258-260 can be converted into a format that can be stored (for example, in a file or memory buffer), transmitted across a network communication link, and "resurrected" later in the same or another computer environment or network device, in a process referred to as serialization. The serialization of different portions into a single CAPWAP message packet can be performed at, for example, at a control module (120 and 130 in FIG. 1), an access point (140 in FIG. 1), and/or a wireless client device (not shown in FIGS. 1-3). The packed portions in a serialized CAPWAP control packet can be reread according to the serialization format, and can be used to produce a semantically identical clone of the original object (CAPWAP portions 252-256 or extension portions 258-260) at a new network device such as, for example, at a control module, an access point, and/or a wireless client device in a process called deserialization. The deserialization process can determine if the original CAPWAP control packet 250 contains any extension portions (258-260). In some instances, when it is determined that no extension portions (258-260) are present, the CAPWAP control packet is processed according to existing protocols and/or policies at the destination network device. In other instances, when extension portions (258-260) are determined to be present, the extension portions (258-260) are processed by the destination network device and the new features defined by the extension portions (258-260) in the CAPWAP control packet 250 are implemented at the destination network device. This implementation can extend the existing CAPWAP protocol binding as new features are added to the existing CAPWAP protocol binding. Note that software tools other than Google Protocol Buffers can be used to define extension portions (258-260) such as, for example, Extensible Markup Language (XML), Type-Length-Value (TLV), and/or the like.

The extensibility enhancements discussed in FIG. 3 can allow a (CAPWAP) control module or a CAPWAP controller to control access points in both a forward and backward compatible manner. This can allow for system upgrades between CAPWAP controllers and access points to be done under different maintenance windows at the user's convenience. It also allows for new equipment to be added to an existing enterprise network without having to upgrade the entire enterprise network.

Figure 4:
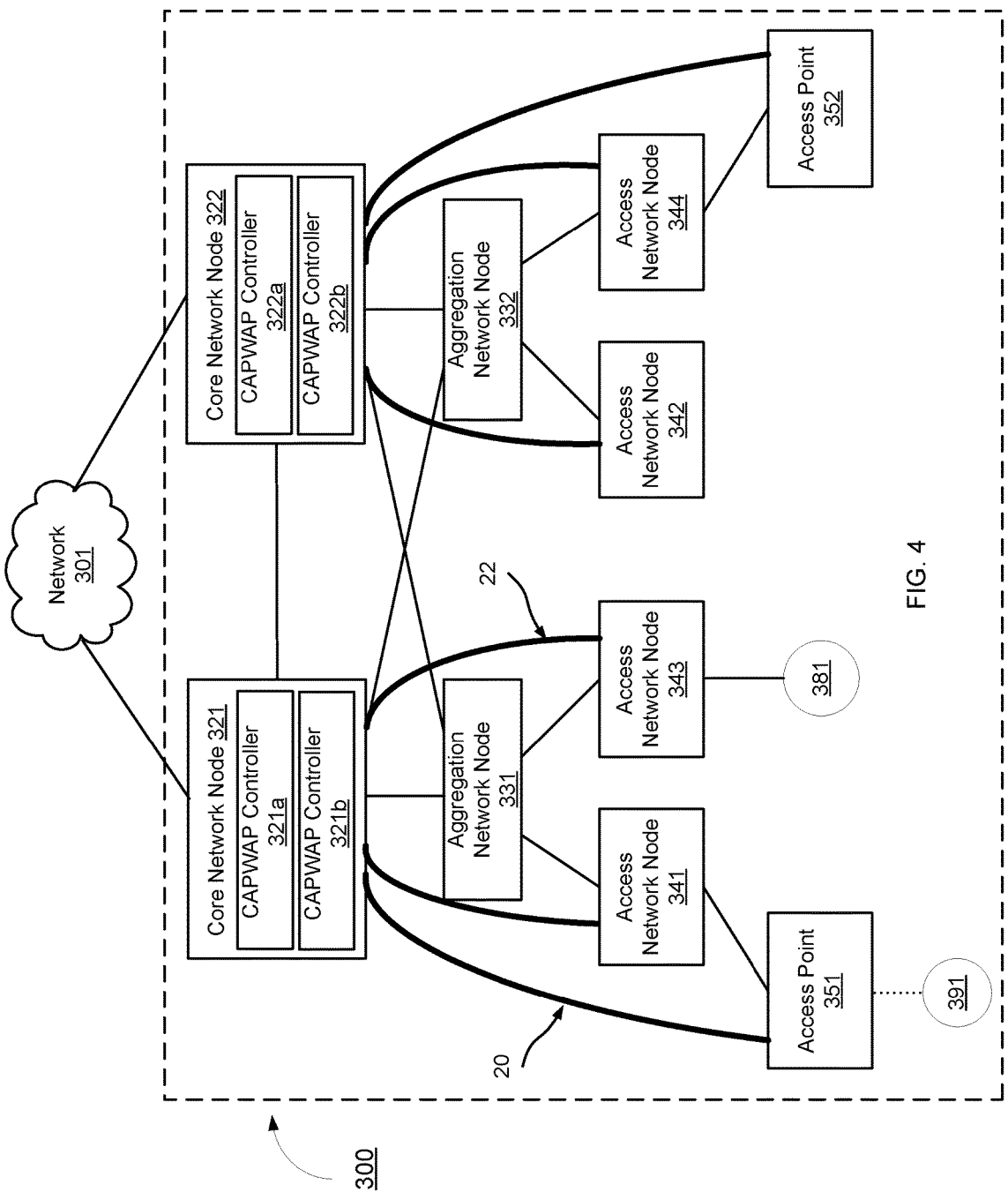
FIG. 4 is a schematic illustration of a homogeneous enterprise network that implements a common control protocol for wired and wireless nodes, according to an embodiment.

FIG. 4 is a schematic illustration of a homogeneous enterprise network having access points, access network nodes, aggregation network nodes, and core network nodes, which implements a common control protocol for wired and wireless nodes, according to an embodiment. The homogeneous enterprise network 300 is described in detail in U.S. patent application Ser. No. 13/252,852 filed on Oct. 4, 2011, and entitled "Methods and Apparatus for a Converged Wired/Wireless Enterprise Network Architecture," the disclosure of which is incorporated herein by reference in its entirety.

An enterprise network can be referred to as a homogeneous enterprise network, or a portion of the enterprise network can be referred to as a homogeneous portion of the enterprise network if every network device included in the enterprise network or a portion of the enterprise network can be controlled by one or more core network nodes. In a homogeneous enterprise network, a common tunneling technology can be used to forward both the wired traffic and the wireless traffic in any portion of the homogeneous enterprise network.

The homogeneous enterprise network 300 comprises of access points (e.g., access point 351, access point 352), access network nodes (e.g., access network node 341-344), aggregation network nodes (e.g., aggregation network node 331, aggregation network node 332), and core network nodes (e.g., core network node 321, core network node 322). The core network nodes 321-322 can implement or include one or more of the CAPWAP control module(s) discussed above (120 and 130 in FIGS. 1 and 220 in FIG. 2), and can manage and/or control both wireless network nodes (devices) as well as wired network nodes (devices).

Figure 7:
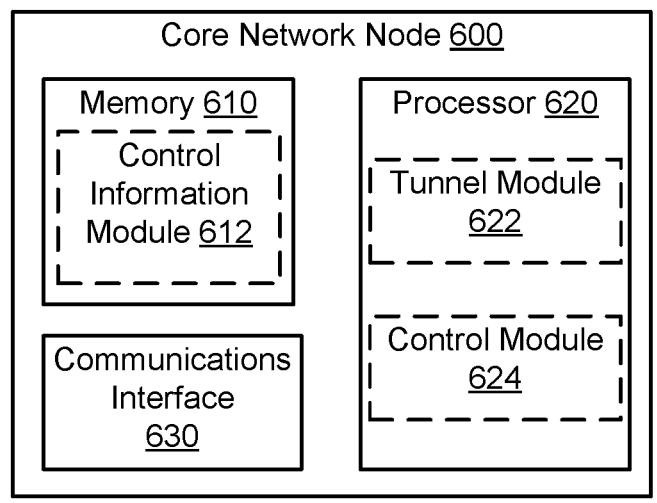
FIG. 7 is a system block diagram of a core network node, according to an embodiment.

The core network node 321 or 322 in a homogeneous enterprise network can be a single device that combines for example a switch, a router, and a controller, and which includes one or multiple control module(s) (e.g., the control module(s) 120 and 130 in FIG. 1, the control module 624 for core network node 600 as shown in FIG. 7 discussed below) configured to manage wired/wireless network nodes and/or wired/wireless user sessions. Core network node (321 and/or 322) is able to forward packets of wired sessions between an aggregation network node 331 or 332 and a network 301 that is operatively coupled to core network node (321 and/or 322).

Additionally, core network nodes 321 and 322 can also establish a wired session with an access network node (341-344), or establish a wireless session with an access point (351-352), through intervening wired network nodes, via a tunnel (e.g., a Multiprotocol Label Switching (MPLS) tunnel, an Ethernet-over-layer-3 tunnel such as a CAPWAP tunnel or Generic Routing Encapsulation (GRE) tunnel) that can pass both data packets and/or control packets. Examples of control packets passing via a tunnel between the core network node 321 and access network nodes 341, 343, and access point 351 include discovery request messages, discovery response messages, authentication response messages, configuration status request messages, configuration status response messages, and/or the like. Details on tunneling of session data between a core network node and an access network node and/or an access point within a homogeneous enterprise network are described below. In some embodiments, a core network node in a homogeneous enterprise network can be referred to as a core SRC (switch, router, and controller).

In some embodiments, core network nodes 321 and/or 322 can implement or include one or multiple (CAPWAP) control modules(s) (CAPWAP controllers) to control and/or manage access points 351 and/or 352. In some instances, a first (CAPWAP) control module implemented within core network node 321 can be configured to be a backup control module for the wireless access point 351 during a first time period. The first control module 321a can be configured to receive status message(s) containing state information associated with the access point 351 and status information associated with a second control module 321b implemented within core network node 321 during the first time period. In the first time period, the second control module 321b can be designated to be the primary control module for access point 351. The first control module 321a can also be configured to exchange periodic "keep alive" messages with the second control module 321b in the first time period as described above for the case of FIG. 1. The first control module 321a can be configured to be automatically designated as the primary control module for the access point 351 during a second time period (which is after the first time period) if the second control module 321b does not operate according to at least one predefined criterion. An example of a predefined criterion can be the number of link failures for a network communication session between the second control module 321b and the access point 351 exceeding a predetermined number in a specified time period.

In one example, the first control module 321a can be configured to take over the designation of the primary control module for the access point 351, for example, when the first control module 321a receives, from the wireless access point 351, a signal notifying that the second control module 321b is not operating according to the at least one predefined criterion. In another example, the first control module 321a can also be configured to take over the designation of the primary control module for the access point 351 when the first control module 321a does not receive a "keep alive" message from the second control module 321b within a predetermined time period.

In the homogeneous enterprise network 300 shown in FIG. 4, access points 351-352 can be configured to transmit wireless traffic to core network node 321 or core network node 322 via a tunnel (e.g., a tunnel represented by 20 in FIG. 4) through intervening access network nodes 341-344 and aggregation network nodes 331-332. In some instances, the tunnel 20 can be configured to pass control packets such as, for example, session management packets, or image management packets, or statistic collection packets, or logging packets between the core network node 321 and the access point 351. In such instances, the tunnel 20 can be either a session management channel, an image management channel, a statistic collection channel, or a logging channel. Note that data packets exchanged between the core network node 321 and the access point 351 can pass through separate data channels.

The first (CAPWAP) control module 321a can be configured to exchange, during the second time period (i.e., after the first control module 321a has taken over the designation as the primary control module for the access point 351), CAPWAP control signals with the access point 351 based on the state information of the access point 351 via the tunnel 20. The first control module 321a can also be configured to send a signal to establish a Transport Control Protocol (TCP) session with the wireless access point 351 during at least the second time period. Additionally, in some embodiments, the first control module 321a can be configured to send to the access point 351, a control packet that includes a CAPWAP header portion specific to a type of the control packet such as, for example, a control packet associated with a wired implementation of CAPWAP without defining or being specific to a new CAPWAP binding. In such embodiments, the extensibility enhancements shown and described with respect to FIG. 3 can be used.

Similar to core network nodes 321-322, other devices in the homogeneous enterprise network 300, including aggregation network node 331-332, access network node 341-344, and access point 351-352, can be configured to operate in a homogeneous enterprise network. Specifically, the functionality of access network node 341-344 and aggregation network node 331-332 includes multiplexing client traffic including data and control packets of wired and wireless sessions, to core network node 321 or core network node 322 without the need for local switching or complex forwarding and classification functionality. For example, aggregation network node 331 does not need to be configured to switch or route a control packet received from access network node 343 that is destined for another access network node 341 based on a destination address included in the packet. Instead, aggregation network node 331 can be configured to forward the control packet, through a portion of a tunnel between access network node 343 and core network node 321 (shown as the tunnel represented by 22 in FIG. 4), to core network node 321, from which the packet is further switched or routed to the destination. Similarly stated, access network nodes 341-344 are configured to transmit wired traffic to core network node 321 or core network node 322 via a tunnel that can be configured to pass data packets and/or control packets (e.g., the tunnel represented by 22 in FIG. 4) through intervening aggregation network nodes 331-332.

In such a homogeneous enterprise network 300, (request) signals requesting control information (e.g., dynamic host configuration protocol (DHCP) requests, address resolution protocol (ARP) requests, etc.) for one or more client devices typically do not need to be broadcast to all network entities within the homogeneous enterprise network 300, such that the control information associated with the request signals can still be retrieved and sent to the client devices. In addition, network 301 can be a network coupled to the homogeneous enterprise network 300 through core network node 321 and/or core network node 322, which can provide access to data resources, applications, and/or information services, to client devices that are operatively coupled to the homogeneous enterprise network 300. For example, network 301 can be a data center network, a wide area network (WAN), the internet, etc.

In an enterprise network, the tunneling technology applied between a core network node and an access device (e.g., an access network node, an access point) depends on the nature and/or capabilities of the core network node, the access device, and the intermediate network device(s) (e.g., aggregation network node) present between the core network node and the access device. For example, if (wireless) client device 391 sends a packet to (wireless) access point 351 that is destined for (wired) client device 381, the packet is first encapsulated according to a specific tunneling protocol (for example, an MPLS tunneling protocol or an Ethernet-over-layer-3 tunneling protocol such as CAPWAP) at access point 351, and then transmitted to core network node 321 via a tunnel through access network node 341 and aggregation network node 331 (shown as the tunnel represented by 20 in FIG. 4). Next, the encapsulated packet is decapsulated according to the specific tunneling protocol at core network node 321. Then based on a destination IP address or a destination media access control (MAC) address included in the packet, the packet is encapsulated again according to the specific tunneling protocol at core network node 321, and the encapsulated packet is forwarded by core network node 321 to access network node 343 via another tunnel (for example, an MPLS tunnel or an Ethernet-over-layer-3 tunnel) through aggregation network node 331 (shown as the tunnel represented by 22 in FIG. 4). Finally, the encapsulated packet is decapsulated according to the specific tunneling protocol at access network node 343, from which the decapsulated packet is delivered to the (wired) client device 381.

In another example, if (wireless) client device 391 sends a packet to access point 351 destined to an IP address located in network 301, the packet is first encapsulated according a specific tunneling protocol (for example, an MPLS tunneling protocol or an Ethernet-over-layer-3 tunneling protocol such as CAPWAP) at the access point 351, and then transmitted to core network node 321 via a tunnel through access network node 341 and aggregation network node 331 (shown as the tunnel represented by 20 in FIG. 4). Next, the encapsulated packet is decapsulated according to the specific tunneling protocol at core network node 321. Finally, based on a destination IP address included in the packet, the decapsulated packet is forwarded by core network node 321 to network 301, and further delivered to the destination device associated with the destination IP address in network 301.

In some instances, the (wireless) access point 351 can be configured to send using TCP and at a first time, a first CAPWAP control packet to the core network node 321 that can implement a CAPWAP control module such as, for example, CAPWAP controller 321*a* and/or 321*b*. The first CAPWAP control packet can be at least one of a session management packet (e.g., a CAPWAP discovery request message, a CAPWAP configuration status request message), an image management packet, a statistic collection packet, or a logging packet. The access point 351 can be configured to activate a TCP timer based on sending the first CAPWAP control packet. The access point 351 can also be configured to send, using TCP, a second CAPWAP control packet to the core network node 321 after the first time and before a second time, and receive, using TCP at a second time, a CAPWAP control packet (signal) sent from the core network node 321 that is a response to the first CAPWAP control packet. The response signal to the first CAPWAP control packet can be, for example, a TCP acknowledgement signal, a discovery response message, a configuration status response message, and/or the like. In some embodiments, the access point 351 can receive both a TCP acknowledgement signal, and a discovery response message or a configuration status response message. The access point 351 can be configured to suspend the TCP timer in response to receiving the response to the first CAPWAP control packet such that the TCP timer provides an indication of the duration of time between the first time and the second time. This time duration can indicate the time associated with a round-trip travel of a CAPWAP control packet from the wireless access point 351 to a CAPWAP control module implemented in the core network node 321 (e.g., CAPWAP controller 321*a* and/or 321*b*). In some embodiments, for example, the access point 351 can be configured to suspend the TCP timer in response to a TCP acknowledgement signal. In such embodiments, the access point 351 can receive a discovery response message, a configuration status response message and/or the like in addition to receiving the TCP acknowledgement signal.

Note that CAPWAP control packets are sent through CAPWAP control tunnels (CAPWAP control packets typically do not use CAPWAP data tunnels for transmission). While the CAPWAP control packets sent back and forth between the access point 351 and core network node 321 use TCP (instead of the traditionally used UDP) via tunnel 20, the CAPWAP control packets are formatted as a datagram to conform to the CAPWAP protocol. Additionally, because CAPWAP control packets are being sent between the access point 351 and the core network node 321 using TCP, the connection between the access point 351 and the core network node 321 is secured using a Transport Layer Security (TLS) protocol. In some instances, the first CAPWAP control packet can include a header portion specific to a type of the first CAPWAP control packet and not specific to a CAPWAP protocol binding.

Homogeneous enterprise network 300 implements a centralized core architecture. As described in detail herein, core network nodes of the homogeneous enterprise network 300 can provide a single point of configuration and management for all network services as well as a single logic point of interaction for authentication, visibility and monitoring applications. As a result, various types of service modules can be aggregated and/or consolidated at one or more core network nodes 321-322, such as firewall, intrusion detection policy (IDP), virtual private network (VPN) termination, and/or load balancing, etc. In such a homogeneous enterprise network 300, services no longer need to be distributed at various levels in the network, and users can be given consistent policy that is independent of their access mechanism.

Moreover, the core network nodes of the homogenous enterprise network also can provide a single point of session management so that client devices (e.g., wired client device 381 in FIG. 4, and wireless client devices 391 in FIG. 4) are authenticated upon entry into the homogenous enterprise network 300. As discussed herein, tunneled traffic (such as data packets and/or control packets), regardless of its origin, passes through the core network node(s) 321-322 including for example, tunneled traffic from client devices 381, 391 that is directed through a core network node 321 or 322 by the respective access network node 341-344 (for a wired client device) and access point 351-352 (for a wireless client device). Because such tunneled traffic passes through the core network nodes 321-322, the core network nodes 321-322 that implement the control module (as discussed in FIGS. 1 and 2) can perform authentication as the client devices 381, 391 enter the homogenous enterprise network. This authentication of client devices 381, 391 allows the core network nodes 321-322 to establish the location of each of these client devices 381, 391 and their associated MAC addresses. Thus, no unknown MAC addresses exist within the homogenous enterprise network 300 and no need exists for flooding related to MAC addresses.

In the homogeneous enterprise network 300, the (request) signals requesting control information (e.g., DHCP requests, ARP requests, etc.) for one or more client devices 381, 391 typically do not need to be broadcast to all network entities within the homogeneous enterprise network 300, and the control information associated with the request signals can still be retrieved and sent to the client devices 381, 391. Specifically, a client device (e.g., a wired client device 381, a wireless client device 391) can originate and send a request signal to an access device (e.g., an access network node 343, an access point 351) coupled (e.g., directly coupled, wirelessly coupled) to the client device 381 or 391. After receiving the request signal (unlike in an overlay enterprise network), the access device 343 or 351 is configured to send the request signal to a core network node 321 operatively coupled to the access device 343 or 351 via a tunnel 20 or 22 (for example, an MPLS tunnel or an Ethernet-over-layer-3 tunnel). The tunnel can include one or more wired network nodes (e.g., an access network node 343, an aggregation network node 331) operatively coupled between the core network node 321 and the access device 343 or 351. In response to receiving the request signal, the core network node 321 is configured to retrieve control information associated with the request signal without broadcasting any other signal. In some embodiments, the associated control information can be retrieved from a data structure stored in the memory of the core network node 321 itself. In some other embodiments, the associated control information can be retrieved from a server device (e.g., a DHCP server) operatively coupled to the core network node 321. Thus, the core network node 321 is configured to send the control information back to the access device 343 or 351 via the tunnel 20 or 22, from which the control information is further forwarded to and then configured accordingly at the client device 381 or 391.

In some instances, the CAPWAP protocol can use DHCP requests as part of the CAPWAP discovery request signals sent from a (wireless) access point (e.g., access point 351) to a CAPWAP controller (e.g., CAPWAP controllers 321a and/or 321b implemented in the core network node 321) to establish a communication link between the access point and the CAPWAP controller once an access point enters a network such as the homogeneous enterprise network 300. In such instances, the DHCP request can be included as part of the CAPWAP control packet. In other instances, the CAPWAP protocol can also use DHCP requests as part of the CAPWAP authentication signals sent from a (wireless) client device (e.g., client device 391) to a CAPWAP controller (e.g., CAPWAP controllers 321a and/or 321b implemented in the core network node 321) requesting an IP address, a subnet address, a gateway address, and/or other IP configuration information once the (wireless) client device enters a network. In such instances, the DHCP request can be included as part of the CAPWAP control packet.

In such instances, a DHCP request does not need to be broadcast from a client device 381 or 391 to all network devices (or various non-core-network-nodes) within the homogeneous enterprise network 300, such that control information associated with the DHCP request can be retrieved and sent to the client device 381 or 391. Specifically, after (wireless) client device 391 is initially wirelessly coupled to access point 351, wireless client device 391 can originate and send a DHCP request to access point 351. Access point 351 can then be configured to send the DHCP request to core network node 321 via a tunnel (shown as the tunnel represented by 20 in FIG. 4) through access network node 341 and aggregation network node 331. In response to receiving the DHCP request, core network node 321 is configured to send a unicast signal to a DHCP server (not shown in FIG. 4). In some embodiments, the DHCP server is directly coupled to the core network node 321. In some other embodiments, the DHCP server is operatively coupled to the core network node 321 through intervening node(s) and/or network(s), and the core network node 321 can be configured to communicate with the DHCP server to retrieve the control information without broadcasting any signal. The core network node 321 can retrieve the control information associated with wireless client device 391 from the DHCP server such as, for example, an IP address, a subnet address, a gateway address, and/or other IP configuration information. Core network node 221 can then be configured to send the control information (e.g., a CAPWAP authentication response signal) to access point 351 via the tunnel 20, from which the control information is forwarded to and then applied accordingly at the (wireless) client device 391. Note that the aggregation network nodes 331-332 are also controlled by CAPWAP. In some embodiments, for example, the aggregation network nodes 331-332 have a subset of the functionality of the access network nodes 341-344 that includes no session state and no tunnel end-points.

Figure 5:
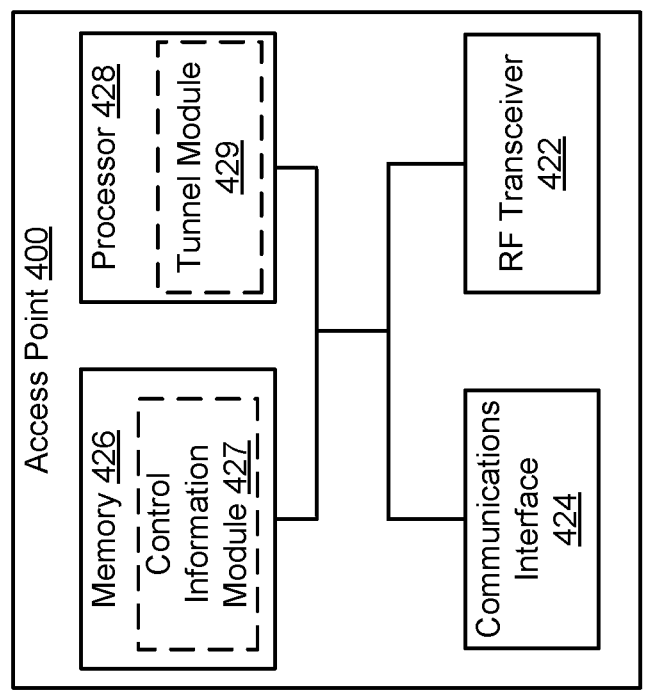
FIG. 5 is a system block diagram of an access point, according to an embodiment.

FIG. 5 is a system block diagram of an access point 400, according to an embodiment. Similar to access point 351 and access point 352 in the homogeneous enterprise network 300 shown in FIG. 4, access point 400 can be any device that connects one or more wireless client devices to an enterprise network (e.g., via an access network node) using for example, Wi-Fi, Bluetooth or other wireless communication standards. For example, access point 400 can be a wireless access point (WAP). As shown in FIG. 5, access point 400 includes a radio frequency (RF) transceiver 422, a communications interface 424, a memory 426 that contains a control information module 427, and a processor 428 that contains a tunnel module 429. Each component of access point 400 is operatively coupled to the other components of the access point 400. Furthermore, all of the operations of the RF transceiver 422 (e.g., transmit/receive data), the communications interface 424 (e.g., transmit/receive data), tunnel module 429 (e.g., encapsulate/decapsulate control and data packets), as well as manipulations on memory 426, can be controlled by the processor 428. The processor 428 can be, for example, a general purpose processor, a Field Programmable Gate Array (FPGA), an Application Specific Integrated Circuit (ASIC), a Digital Signal Processor (DSP), and/or the like. The processor 428 can be configured to run and/or execute application processes and/or other modules, processes and/or functions associated with the access point 400. The processor 428 includes a tunnel module 429 that can execute application processes and/or other modules, processes and/or functions associated with establishing and maintaining a tunnel (e.g., an Ethernet-over-layer-3 tunnel such as CAPWAP tunnel, a MPLS tunnel, etc.) as described in greater detail herein. For example, the tunnel module 429 can be responsible for the encapsulation and decapsulation of incoming and/or outgoing control packets and data packets passing through the tunnel.

Access point 400 can communicate with a wireless client device (e.g., a Wi-Fi enabled laptop, a mobile phone) using any suitable wireless communication standard such as, for example, Wi-Fi, Bluetooth, and/or the like. Specifically, access point 400 can be configured to receive data and/or send data through RF transceiver 422, when communicating with a wireless client device. Furthermore, in some embodiments, a first access point of a homogeneous enterprise network can use a first wireless communication standard to wirelessly communicate with a first wireless client device operatively coupled to the first access point; a second access point can use a second wireless communication standard to wirelessly communicate with a second wireless client device operatively coupled to the second access point. For example, as shown in FIGS. 4 and 5, access point 351 can send data packets or control packets through its RF transceiver 422 to wireless host device 391 (e.g., a Wi-Fi enabled laptop) based on the Wi-Fi standard; access point 352 can send data packets and/or control packets from its RF transceiver 422 to another wireless client device (e.g., a Bluetooth-enabled mobile phone) (not shown in FIG. 4) based on the Bluetooth standard.

In some embodiments, access point 400 can be operatively coupled to an access network node by implementing a wired connection between communications interface 424 of the access point 400 and the communications interface of the access network node. The wired connection can be, for example, twisted-pair electrical signaling via electrical cables, fiber-optic signaling via fiber-optic cables, and/or the like. As such, access point 400 can be configured to receive data packets and control packets and/or send data packets and control packets through communications interface 424, which is connected with the communications interface of an access network node, when access point 400 is communicating with the access network node. In some embodiments, a first access point of a homogeneous enterprise network can implement a wired connection with a first access network node operatively coupled to the first access point; a second access point of the homogeneous enterprise network can implement a different wired connection with a second access network node operatively coupled to the second access point. For example, as shown in FIG. 4, access point 351 can implement one wired connection such as twisted-pair electrical signaling to connect with access network node 341; access point 352 can implement a different wired connection such as fiber-optic signaling to connect with access network node 344.

In some instances, when the network device (e.g., a core network node) at the end of the tunnel and the intervening wired network nodes (e.g., access network nodes, aggregation network nodes) are within a homogeneous enterprise network or a homogeneous portion of a heterogeneous enterprise network (as described with respect to FIG. 4), tunnel module 429 can be configured to encapsulate or decapsulate a packet according to a tunneling protocol such as an MPLS or an Ethernet-over-layer-3 (CAPWAP) tunneling protocol. In such instances, access point 400 can be configured to send a packet to and/or receive a packet from a core network node via the tunnel through intervening wired network nodes.

For example, in some instances, as described with respect to FIGS. 4 and 5, access point 400 can be configured to prepare a packet (e.g., a data packet, a control packet) received from a wireless client device (such as the wireless client device 391) operatively coupled to access point 400, and send the packet to another network device such as a core network node via a tunnel (e.g., an Ethernet-over-layer-3 tunnel such as a CAPWAP tunnel, a MPLS tunnel). Access point 400 can also be configured to decapsulate a packet received via a tunnel from another network device such as a core network node (321 or 322 in FIG. 4), before forwarding the decapsulated packet to a wireless client device operatively coupled to access point 400.

Specifically, upon receiving a (data or control) packet from a wireless client device operatively coupled to access point 400, the tunnel module 429 is configured to encapsulate the packet (e.g., add a header portion, a footer portion, and/or modify any other identifiers included within the packet) according to a specific tunneling protocol. The encapsulated packet is then sent through communications interface 424 to an access network node connected to access point 400, from which the encapsulated packet is forwarded along the tunnel to a network device at the end of the tunnel. On the other hand, upon receiving a (data or control) packet from an access network node (that is sent through a tunnel from a network device) connected to access point 400, tunnel module 429 is configured to decapsulate the packet (e.g., remove a header portion, a footer portion, and/or modify any other identifiers included within the packet) according to a specific tunneling protocol. The decapsulated packet is then sent by RF transceiver 422 to a wireless client device operatively coupled to access point 400.

The memory 426 can be, for example, a random access memory (RAM), a memory buffer, a hard drive, a database, an erasable programmable read-only memory (EPROM), an electrically erasable read-only memory (EEPROM), a read-only memory (ROM), a flash memory, and/or so forth. The memory 426 can store instructions to cause the processor 428 to execute modules, processes and/or functions associated with the access point 400. The memory 426 includes a control information module 427. The control information module 427 can be a hardware module or software module (stored in memory 426 and executed in processor 428) that can store data related to control and operation of the access point 400.

In some embodiments, for example, MAC addresses of potential user communication devices (client devices) can be stored in the control information module 427, such that a user communication device (client device) can be recognized by access point 400 upon being operatively coupled to access point 400. In another example, information associated with tunneling packets to a core network node can be stored in the control information module 427, such that establishing a tunnel with the core network node can be initialized by access point 400. In yet another example, an up-link policy table (not shown in FIG. 4) can be stored in the control information module 427, such that one or more up-link policies associated with a user can be downloaded to and enforced at access point 400 when the user is operatively coupled to access point 400 using a wireless client device.

In another example, the control information module 427 can contain a routing table (not shown in FIG. 5) that can list the routes to particular network destinations for incoming and/or outgoing control packets and data packets. The routing table can also store route information (such as IP or MAC addresses of network nodes, and/or devices, and/or interfaces) on directly connected and remote networks. Additionally, the routing table can also contain "next hop" associations indicating an intermediate destination along a specified path to the destination device or network node.

Similar to access points 351, 352 in the homogeneous enterprise network 300 described above with respect to FIG. 4, access point 400 does not broadcast a request signal (e.g., a DHCP request, an ARP request, ND request) received at RF transceiver 422 from a wireless client device wirelessly coupled to access point 400. Instead, access point 400 is configured to send the request signal to a core network node operatively coupled to access point 400 via a tunnel. Specifically, tunnel module 429 is configured to encapsulate the request signal according to a predetermined tunneling protocol (e.g., CAPWAP, GRE, MPLS, etc.). The encapsulated request signal is then sent through communications interface 424 to the core network node via a specific tunnel. Similarly, access point 400 is configured to receive encapsulated control information associated with the request signal from the core network node via the tunnel, decapsulate the received control packets to retrieve the control information, and then send the control information via the RF transceiver 422 to the wireless client device wirelessly coupled to access point 400.

The access point 400 is configured to send using TCP and at a first time, a first CAPWAP control packet to the core network node via the communication interface 424. The first CAPWAP control packet can be at least one of a session management packet, an image management packet, a statistic collection packet, or a logging packet. The access point 400 can be configured to activate a TCP timer (not shown in FIG. 5) based on sending the first CAPWAP control packet. The access point 400 can also be configured to send, using TCP, a second CAPWAP control packet to the core network node after the first time and before a second time via the communication interface 424. The access point 400 can be configured to receive via the communication interface 424 at a second time, a response to the first CAPWAP control packet. The response signal to the first CAPWAP control packet can be, for example, a TCP acknowledgement signal, or a CAPWAP control signal (packet) such as, for example, a discovery response message, a configuration status response message, and/or the like. In some embodiments, the access point 400 can receive both a TCP acknowledgement signal, and a discovery response message or a configuration status response message. The access point 400 can be configured to suspend the TCP timer in response to receiving the response signal to the first CAPWAP control packet such that the TCP timer provides an indication of the duration of time between the first time and the second time. This time duration can indicate the time associated with a round-trip travel of a CAPWAP control (or data) packet from the access point 400 to a CAPWAP control module (e.g., CAPWAP controllers 321a or 321b as shown in FIG. 4) implemented in the core network node. In some embodiments, for example, the access point 400 can be configured to suspend the TCP timer in response to a TCP acknowledgement signal. In such embodiments, the access point 400 can receive a discovery response message, a configuration status response message and/or the like in addition to receiving the TCP acknowledgement signal.

The access point 400 can be configured to format the CAPWAP control packets sent using TCP as a datagram message to conform to the CAPWAP protocol. Moreover, the communication channel (which can be a tunnel) used to send CAPWAP messages between the access point 400 and core network node using TCP can be secured using the Transport Layer Security (TLS).

Figure 6:
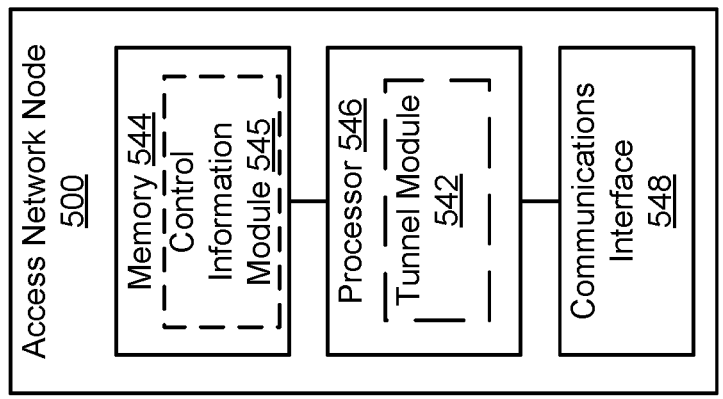
FIG. 6 is a system block diagram of an access network node, according to an embodiment.

FIG. 6 is a system block diagram of an access network node 500, according to an embodiment. Similar to access network node 341-344 in the homogeneous enterprise network 300 shown in FIG. 4, access network node 500 can be any device that connects one or more wired client devices to a homogeneous enterprise network. The access network node 500 can be, for example, an Ethernet switch and/or the like. More specifically, access network node 500 is configured to ensure packets are transmitted between one or more aggregation network nodes, wired client devices, and/or access points that are operatively coupled to access network node 500. As shown in FIG. 6, access network node 500 includes a communications interface 548, a memory 544 that includes a control information module 545, and a processor 546 that includes a tunnel module 542. Furthermore, the operations of the communications interface 548 (e.g., transmit/receive data), the tunnel module 542 (e.g., encapsulate/decapsulate packets), as well as manipulations on the memory 544 (e.g., update a policy table), can be controlled by the processor 546. Similar to the case of the access point 400 (FIG. 5), the processor 546 of the access network node 500 can be, for example, a general purpose processor, a Field Programmable Gate Array (FPGA), an Application Specific Integrated Circuit (ASIC), a Digital Signal Processor (DSP), and/or the like. The processor 546 is operatively coupled with the memory 544 and can be configured to run and/or execute processes, and/or other modules, and/or functions associated with the access network node 500. The processor 546 includes a tunnel module 542 that can execute application processes and/or other modules, processes and/or functions associated with establishing and maintaining a tunnel (e.g., an Ethernet-over-layer-3 (CAPWAP) tunnel, a MPLS tunnel) as described in greater detail herein.

In some embodiments, the communications interface 548 of access network node 500 can include at least two ports (not shown in FIG. 6) that can be used to implement one or more wired connections between the access network node 500 and one or more access points, wired client devices, and/or aggregation network nodes. The wired connection can be, for example, twisted-pair electrical signaling via electrical cables, fiber-optic signaling via fiber-optic cables, and/or the like. As such, access network node 500 can be configured to receive data and/or send data through one or more ports of the communications interface 548, which are connected to the communications interfaces of one or more access points, wired host devices, and/or aggregation network nodes. Furthermore, in some embodiments, access network node 500 can implement a wired connection with one of an access point, a wired client device, or an aggregation network node that is operatively coupled to access network node 500 through one port of the communications interface 548. The access network node 500 can also implement a different wired connection with another access point, wired client device, or aggregation network node that is operatively coupled to access network node 500 through another port of communications interface 548. For example, as shown in FIG. 4, access network node 341 can implement one wired connection such as twisted-pair electrical signaling to connect with access point 351, while implementing a different wired connection such as fiber-optic signaling to connect with aggregation network node 331.

In some embodiments, as described with respect to FIGS. 4 and 6, access network node 500 can be one of the intervening wired network nodes between a (wireless) access point and a core network node, through which a tunnel is established between the access point and the core network node. In such embodiments, access network node 500 can be configured to forward a tunneled (data or control) packet. For example, as shown in FIG. 4, access network node 341 can forward a tunneled packet that is encapsulated according to an Ethernet-over-layer-3 tunneling protocol (e.g., CAPWAP protocol), which is received from access point 351, to the core network node 321 via an Ethernet-over-layer-3 tunnel (e.g., CAPWAP tunnel) (shown as the tunnel represented by 20 in FIG. 4) connecting access point 351 and core network node 321.

Access network node 500 can be configured to prepare (e.g., encapsulate) a control packet or a data packet received from a wired client device operatively coupled to access network node 500, and send the packet to another network device such as a core network node via a tunnel. Access network node 500 can also be configured to decapsulate a packet received via a tunnel from another network device such as a core network node, before forwarding the decapsulated packet to a wired client device operatively coupled to access network node 500. The tunnel module 542 located in the processor 546 of the access network node performs the data packet or control packet encapsulation and decapsulation. Specifically, upon receiving a packet from a wired client device operatively coupled to access network node 500, the tunnel module 542 is configured to encapsulate the packet (e.g., add a header portion, a footer portion, and/or modify any other identifiers included within the packet) according to the specific protocol of the tunnel. The encapsulated packet is then sent through a port of the communications interface 548 to an aggregation network node connected to access network node 500, from which the encapsulated packet is forwarded along the tunnel to a core network node. On the other hand, upon receiving a packet from an aggregation network node connected to access network node 500 that is sent through a tunnel from a core network node, the tunnel module 542 is configured to decapsulate the packet (e.g., remove a header portion, a footer portion, and/or modify any other identifiers included within the packet) according to the specific protocol of the tunnel. The decapsulated packet is then sent through a port of the communications interface 548 to a wired client device operatively coupled to access network node 500.

The memory 544 can be, for example, a random access memory (RAM), a memory buffer, a hard drive, a database, an erasable programmable read-only memory (EPROM), an electrically erasable read-only memory (EEPROM), a read-only memory (ROM), a flash memory, and/or so forth. The memory 544 can store instructions to cause the processor 546 to execute modules, processes and/or functions associated with the access network node 500. The memory 544 includes a control information module 545. The control information module 545 can be a hardware module or software module (stored in memory 544 and executed in processor 546) that can store information related to the control and operation of the access network node 500.

In some instances, for example, the MAC addresses of potential user communication devices (client devices) can be stored in the control information module 545, such that a user communication device (wired client device) can be recognized by access network node 500 upon being operatively coupled to the access network node 500. In some instances, information associated with tunneling packets to a core network node can be stored in the control information module 545, such that establishing a tunnel (such as a MPLS tunnel or an Ethernet-over-layer-3 (CAPWAP) tunnel) with the core network node can be initialized by access network node 500. In yet other instances, an up-link policy table (not shown in FIG. 6) can be stored in the control information module 545, such that one or more up-link policies associated with a user can be downloaded to and enforced at access network node 500 when the user is operatively coupled to access network node 500 using a wired client device.

In another example, the control information module 545 can contain a routing table (not shown in FIG. 6) that can list the routes to particular network destinations for incoming and/or outgoing control packets and data packets. The routing table can also store route information (such as IP or MAC addresses of network nodes, devices and/or interfaces) on directly connected and remote networks. Additionally, the routing table can also contain "next hop" associations indicating an intermediate destination along an optimal path to the destination device or a network node.

Similar to access network nodes 341-344 in the homogeneous enterprise network 300 described above with respect to FIG. 4, access network node 500 does not broadcast a request signal (e.g., a DHCP request, an ARP request, ND request) received at a port of communications interface 548 from a wired host device directly coupled to access network node 500. Instead, access network node 500 is configured to send the request signal to a core network node operatively coupled to access network node 500 via a tunnel. Specifically, tunnel module 542 is configured to encapsulate the request signal according to a specific tunneling protocol (e.g., CAPWAP, GRE, MPLS, etc.). The encapsulated request signal is then sent through a port of communications interface 548 to the core network node via a specific tunnel. Similarly, access network node 500 is configured to receive encapsulated control information associated with the request signal from the core network node via a tunnel, decapsulate the received packets to retrieve the control information, and then send the control information to the wired client device directly coupled to access network node 500.

FIG. 7 is a system block diagram of a core network node 600, according to an embodiment. Similar to core network node 321 and core network node 322 in the homogeneous enterprise network 300 shown in FIG. 4, core network node 600 can be any switching device positioned in the physical core, or backbone, of an enterprise network, which is configured to operatively couple the remaining devices (e.g., aggregation network nodes, access network nodes, access points) of the enterprise network to each other and/or to one or more (other) networks that provide access to data resources and/or information services. More specifically, core network node 600 is configured, for example, to forward data between one or more aggregation network nodes and one or more other networks that are operatively coupled to core network node 600, based on IP routing services. Furthermore, core network node 600 is configured, for example, to manage both wired and wireless network devices, manage user sessions for both wired and wireless clients, and retrieve control information associated with request signals received from wired and wireless host devices, as described in detail herein. This is because the control module 624 that implements protocols for session management, node management, and data tunneling functions for both wired and wireless devices is located in the core network node 600.

As shown in FIG. 7, core network node 600 includes a communications interface 630, a memory 610 that contains a control information module 612, and a processor 620 that contains a tunnel module 622 and a control module 624. Operations of the communications interface 630 (e.g., transmit/receive data and control packets), the tunnel module 622 (e.g., encapsulate/decapsulate data packets and control packets), and the control module 624 (e.g., manage a user session), as well as manipulations on the control information module 612 (e.g., update control information, add new control instructions, etc.) or any other portion of the memory 610, can be controlled by the processor 620.

The processor 620 of the core network node 600 can be, for example, a general purpose processor, a Field Programmable Gate Array (FPGA), an Application Specific Integrated Circuit (ASIC), a Digital Signal Processor (DSP), and/or the like. The processor 620 is configured to run and/or execute processes, and/or other modules, and/or functions associated with the core network node 600. The processor 620 includes a tunnel module 622 and a control module 624. The tunnel module 622 can execute application processes and/or other modules, processes and/or functions associated with establishing and maintaining a tunnel (e.g., an Ethernet-over-layer-3 (CAPWAP) tunnel, a MPLS tunnel, etc.) as described herein. The control module 624 can implement protocols for session management, node management, and data tunneling functions for both wired and wireless devices located in an enterprise network as described in greater detail herein.

The communications interface 630 of core network node 600 can include, for example, at least two ports (not shown in FIG. 7) that can be used to implement one or more wired connections between the core network node 600 and one or more aggregation network nodes, one or more access network nodes, other core network nodes, and/or devices in other networks. The wired connections can be, for example, twisted-pair electrical signaling via electrical cables, fiber-optic signaling via fiber-optic cables, and/or the like. As such, core network node 600 can be configured to receive data packets and control packets and/or send data packets and control packets through one or more ports of the communications interface 630, which are connected with the communications interfaces of one or more aggregation network nodes, one or more access network nodes, other core network nodes, and/or devices in other networks. Furthermore, in some embodiments, core network node 600 can implement one wired connection with one of an aggregation network node, an access network node, another core network node, or a device in another network that is operatively coupled to the core network node 600 through one port of the communications interface 630, while implementing a different wired connection with another aggregation network node, access network node, core network node, or a device in another network that is operatively coupled to core network node 600 through another port of the communications interface 630. For example, as shown in FIG. 4, core network node 321 can implement one wired connection such as twisted-pair electrical signaling to connect with aggregation network node 331, aggregation network node 332 and core network node 322, while implementing a different wired connection such as fiber-optic signaling to connect with a device in the network 301.

Core network node 600 can be configured to encapsulate a packet (e.g., a data packet, a control packet) to be sent to an access device (e.g., an access point, an access network node) via a tunnel. Core network node 600 can also be configured to receive and decapsulate an encapsulated packet from an access device via a tunnel. More specifically, in some instances, upon receiving a data packet or a control packet associated with a user session at a port of the communications interface 630 via a tunnel (such as an Ethernet-over-layer-3 tunnel or a MPLS tunnel), the tunnel module 622 can be configured to decapsulate the packet (e.g., remove a header portion, a footer portion, and/or modify any other identifiers included within the packet) according to the protocol for the tunnel.

Core network node 600 can also be configured to forward some packets to and/or receive some packets from other network devices that are operatively coupled to core network node 600, including other core network nodes and/or devices in other networks. For example, in some instances, the core network node 600 can receive a control packet or a data packet associated with a user session at a port of the communications interface 630 from another network device that is operatively coupled to core network node 600, such as another core network node or a device in another network (for example, a device in network 301 in FIG. 4). To forward the received control packet or data packet to the intended destination, the control module 624 can be configured to check the destination IP address included in the packet. If the received control packet or data packet is not destined for a user in a pod that is directly connected to core network node 600 (e.g., destined to a network device in a pod that is not connected to core network node 600, or destined to a user in another network), the control module 624 is configured to forward the control packet or data packet, from a port of communications interface 630, to a network device that is operatively coupled to core network node 600 such as, for example, another core network node or a device in another network. If the packet is destined to a user in a pod that is directly connected to core network node 600, the tunnel module 622 can be configured to encapsulate the packet (e.g., add a header portion, a footer portion, and/or modify any other identifiers included within the packet) according to a specific tunneling protocol. Meanwhile, control module 624 can be configured to establish a tunnel such as, for example, an Ethernet-over-layer-3 tunnel (e.g., CAPWAP tunnel) or a MPLS tunnel connecting core network node 600 to the access device (e.g., an access network node, an access point) that is operatively coupled to the client device (if such a tunnel is not established yet). Finally, control module 624 is configured to send the encapsulated packet, from a port of communications interface 630, to the access device through the tunnel.

The core network node 600 is configured to receive at the communication interface 630, a first control packet from a (wireless) access point via a first channel (which may or may not include a tunnel) having a first priority, and a second control packet from a (wireless) access point 240 via a second channel (which may or may not include a tunnel) having a second priority that is different than the first priority. As such, the first control packet and the second control packet each can be at least one of a session management packet, an image management packet, a statistic collection packet, or a logging packet as described above. The first channel or the second channel can be at least one of a session management channel, an image management channel, a statistic collection channel, or a logging channel as described above. The core network node 600 can be configured to send via the communication interface 630, in response to the first control packet, a third control packet to the (wireless) access point through the first channel such that the access point receives the third control packet within a period of time after the first control packet is sent. The core network node 600 is also configured to send via the communication interface 630, in response to the second control packet, a fourth control packet to the access point through the second channel such that the access point receives the fourth control packet within a period of time after the fourth control packet is sent. In such embodiments, the period of time after the third control packet is sent is shorter than the period of time after the fourth control packet is sent if the first channel has a higher priority than the second channel.

The memory 610 can be, for example, a random access memory (RAM), a memory buffer, a hard drive, a database, an erasable programmable read-only memory (EPROM), an electrically erasable read-only memory (EEPROM), a read-only memory (ROM), a flash memory, and/or so forth. The memory 610 can store instructions to cause the processor 620 to execute modules, processes and/or functions associated with the core network node 600 and/or the enterprise network. The memory 610 includes a control information module 612. The control information module 612 can be a hardware module or software module (stored in memory 610 and executed in processor 620) that can store information related to the control and operation of the core network node 600.

As described with respect to FIG. 4 and shown in FIG. 7, control information associated with one or more types of request signals, including ARP requests, can be stored in the control information module 612. For example, as shown and described with respect to FIG. 7, one or more IP addresses and one or more MAC addresses of network entities (e.g., client devices, access points, access network nodes, aggregation network nodes, etc.) in a homogeneous enterprise network can be stored in, for example, a lookup-table or a database located in the control information module 612. As described herein, in response to receiving an ARP request from a client device, processor 620 of core network node 600 can be configured to retrieve from the control information module 612, control information (including a MAC address associated with an IP address) associated with the ARP request, and then send the control information (that can include the MAC address) to the client device from a port of the communications interface 630.

In some instances, data other than the control information associated with request signals that is related to the operation of core network node 600 can also be stored in the control information module 612. For example, information associated with tunneling data and/or control packets (via separate tunnels for data packets and control packets) to one or more access devices can be stored in control information module 612, such that establishing a tunnel with one or multiple access devices can be initiated by core network node 600. The control information module 612 can include additional control information such as, for example, a list of the CAPWAP binding protocols supported by the control module 600, the control module 600 state information, the addresses of interfaces running the CAPWAP Control Internet Protocol version 4 (IPv4), the addresses of interfaces running the CAPWAP Control Internet Protocol version 6 (IPv6), the CAPWAP timer portion, the access network node fall back portion, and/or so forth.

In some embodiments, data other than the control information can be stored in the memory 610. For example, combinations of user IDs and passwords of potential users can be stored in memory 610, such that the identification of a user can be verified by core network node 600 upon a user ID and a password being provided to core network node 600. Alternatively, the memory 610 can also store address information for an external server that can store user authentication information (e.g., user IDs and passwords) and related policy.

Similar to core network nodes 321 and 322 in the homogeneous enterprise network 300 described with respect to FIG. 4, core network node 600 does not broadcast a request signal (e.g., a DHCP request, an ARP request) received at a port of communications interface 630 via a tunnel from an access device (e.g., an access network node, an access point) coupled to a client device (e.g., a wired client device, a wireless client device). Instead, core network node 600 is configured to retrieve control information associated with the request signal, and then send the control information to the access device via the tunnel, from which the control information is forwarded to and then applied at the client device.

Referring to FIGS. 4 and 7, in some embodiments, core network node 400 can implement multiple CAPWAP control modules(s) to control and/or manage various access points such as access points 351 and/or 352 (shown in FIG. 4). In some instances, a first control module implemented within core network node 600 can be configured to be a backup control module for the wireless access point 351 during a first time period. The first control module can be configured to receive status message(s) containing state information associated with the access point 351 and a second control module implemented within core network node 600 during the first time period. In the first time period, the second control module can be designated to be the primary control module for the (wireless) access point 351. The first control module can also be configured to exchange periodic "keep alive" messages with the second control module in the first time period as described above for the case of FIG. 1. In such instances, the first control module can be configured to be automatically designated as the primary control module for the access point 351 during a second time period (which is after the first time period) if the second control module does not operate according to at least one predefined condition. An example of a predefined criterion can be the number of link failures for a network communication session between the second control module and the access point 351 exceeding a predetermined number within the first time period. The first control module can also be configured to be automatically designated as the primary control module for the access point 351 if it does not receive a "keep alive" message from the second control module for a period of time preceding the second time period.

Figure 8:
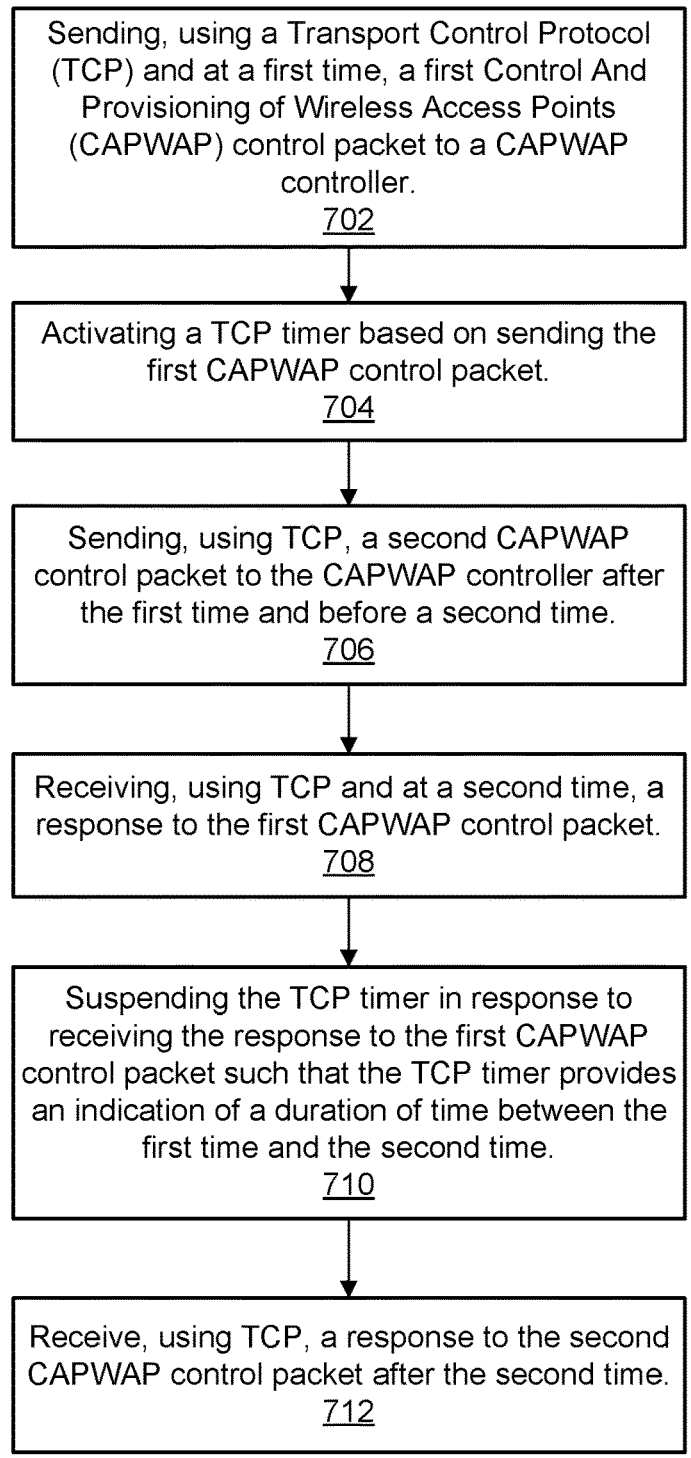
FIG. 8 is a flow chart of a method for sending and receiving CAPWAP control packets using TCP from an access point to a CAPWAP controller and measuring the duration of time taken between sending and receiving CAPWAP control packets, according to an embodiment.

FIG. 8 is a flow chart of a method for sending and receiving CAPWAP control packets using TCP from an access point to a CAPWAP controller and measuring the duration of time taken between sending and receiving CAPWAP control packets, according to an embodiment. As shown in FIG. 8, a first CAPWAP control packet is sent to a CAPWAP controller using a Transport Control Protocol (TCP) and at a first time, at 702. As described above, the CAPWAP controller can be a control module implemented in a core network node of a homogeneous enterprise network. The first CAPWAP control packet can be at least one of a session management packet (such as a discovery request message, a configuration status request message, etc.), an image management packet, a statistic collection packet, or a logging packet. As also described above, the first CAPWAP control packet can be sent from, for example, a (wireless) access point to, for example, the CAPWAP controller via, for example, a first control channel which may or may not be a tunnel and which can have a first priority level.

At 704, a TCP timer is activated based on sending the first CAPWAP control packet. As described above, use of TCP can add more capabilities to an existing CAPWAP protocol because TCP has more features than UDP such as timers. The TCP timers can be used to measure the duration of time taken between sending a CAPWAP control packet from an access point to a CAPWAP controller and receiving a response message from the CAPWAP controller. This time duration can be used to set a timeframe for an access point (or a CAPWAP controller) to wait for a response after sending a data packet or a control packet before re-transmitting the same data packet or control packet.

At 706, a second CAPWAP control packet is sent to the CAPWAP controller after the first time and before a second time using TCP. The second CAPWAP control packet can be sent from, for example, the access point to, for example, the CAPWAP controller via, for example, a second control channel that can have a second priority level, whereby the data packets and control packets passing through both the first and the second control channels can be secured using a Transport Layer Security (TLS).

At 708, a response to the first CAPWAP control packet is received using TCP at a second time. The response to the first CAPWAP control packet can be, for example, a TCP acknowledgement signal. In some embodiments, the TCP acknowledgement signal can include an acknowledgment sequence number and no payload. The TCP acknowledgement signal can be sent from, for example, the CAPWAP controller to, for example, the access point. In some embodiments, the response to the first CAPWAP control packet can also include a third CAPWAP control packet. The third CAPWAP control packet can be at least one of a session management packet (such as a discovery response message, a configuration status response message, etc.), an image management packet, a statistic collection packet, or a logging packet. As described above, the third CAPWAP control packet can be of a type associated with the first CAPWAP control packet. For example, if the first CAPWAP control packet is an encrypted packet, then the third CAPWAP control packet will also be an encrypted packet. The CAPWAP controller can also be configured to send the third CAPWAP control packet to the access point via the first control channel.

At 710, the TCP timer is suspended in response to receiving the response to the first CAPWAP control packet (e.g., in response to receiving the TCP acknowledgement signal) such that the TCP timer provides an indication of the duration of time between the first time and the second time. As described above, the duration of time between the first time and the second time can be used to set a timeframe for an access point (or a CAPWAP controller) to wait for a response after sending a data packet or control packet before automatically re-transmitting the same data packet or control packet. This can overcome the complications that can otherwise arise from accidental loss of data packets and control packets in the network.

At 712, a response to the second CAPWAP control packet is received using TCP after the second time. As described above, the response to the second CAPWAP control packet can include a fourth CAPWAP control packet that can be sent from, for example, the CAPWAP controller to, for example, the access point. The fourth CAPWAP control packet (response signal) can be at least one of a session management packet (such as a discovery response message, a configuration status response message, etc.), an image management packet, a statistic collection packet, or a logging packet. As described above, the fourth CAPWAP control packet can be of a type associated with the second CAPWAP control packet. For example, if the second CAPWAP control packet is not an encrypted packet, then the fourth CAPWAP control packet will also not be encrypted. The CAPWAP controller can also be configured to send the fourth CAPWAP control packet to the access point via the second control channel. As described above, the period of time after the third CAPWAP control packet is sent is shorter than the period of time after the fourth CAPWAP control packet is sent if the first control channel has a higher priority than the second control channel.

The apparatus and methods described in FIGS. 1-8 can, for example, enhance the performance, robustness, extensibility, and Quality of Service (QoS) when using CAPWAP protocols. These enhancements to the CAPWAP protocol can result in better system performance. For example, Wi-Fi functions such as authentication and handoff can occur faster and with increased consistency on busy enterprise networks. Additionally, dropped sessions can also be significantly reduced by the use of a backup CAPWAP controller in addition to the primary CAPWAP controller for an access point.

While shown and described above as sending and receiving control packets, in other embodiments the control module can send and receive control cells, control frames, control data units and/or any other control signals and/or messages.

Some embodiments described herein relate to a computer storage product with a non-transitory computer-readable medium (also can be referred to as a non-transitory processor-readable medium) having instructions or computer code thereon for performing various computer-implemented operations. The computer-readable medium (or processor-readable medium) is non-transitory in the sense that it does not include transitory propagating signals per se (e.g., a propagating electromagnetic wave carrying information on a transmission medium such as space or a cable). The media and computer code (also can be referred to as code) may be those designed and constructed for the specific purpose or purposes. Examples of non-transitory computer-readable media include, but are not limited to: magnetic storage media such as hard disks, floppy disks, and magnetic tape; optical storage media such as Compact Disc/Digital Video Discs (CD/DVDs), Compact Disc-Read Only Memories (CD-ROMs), and holographic devices; magneto-optical storage media such as optical disks; carrier wave signal processing modules; and hardware devices that are specially configured to store and execute program code, such as Application-Specific Integrated Circuits (ASICs), Programmable Logic Devices (PLDs), Read-Only Memory (ROM) and Random-Access Memory (RAM) devices. Other embodiments described herein relate to a computer program product, which can include, for example, the instructions and/or computer code discussed herein.

Examples of computer code include, but are not limited to, micro-code or micro-instructions, machine instructions, such as produced by a compiler, code used to produce a web service, and files containing higher-level instructions that are executed by a computer using an interpreter. For example, embodiments may be implemented using imperative programming languages (e.g., C, Fortran, etc.), functional programming languages (Haskell, Erlang, etc.), logical programming languages (e.g., Prolog), object-oriented programming languages (e.g., Java, C++, etc.) or other suitable programming languages and/or development tools. Additional examples of computer code include, but are not limited to, control signals, encrypted code, and compressed code.

While various embodiments have been described above, it should be understood that they have been presented by way of example only, and not limitation. Where methods described above indicate certain events occurring in certain order, the ordering of certain events may be modified. Additionally, certain of the events may be performed concurrently in a parallel process when possible, as well as performed sequentially as described above.

What is claimed is:

1. A non-transitory processor-readable medium storing code representing instructions to be executed by a processor, the code comprising code to cause the processor to:
   send, from a wireless access point using a Transport Control Protocol (TCP) and at a first time, a first Control And Provisioning of Wireless Access Points (CAPWAP) control packet to a CAPWAP controller via a CAPWAP tunnel, the CAPWAP control packet includes a Dynamic Host Configuration Protocol (DHCP) request;
   activate a TCP timer based on sending the first CAPWAP control packet;
   send, using TCP, a second CAPWAP control packet to the CAPWAP controller after the first time and before a second time;
   receive, using TCP and at the second time, a response to the first CAPWAP control packet;
   suspend the TCP timer in response to receiving the response to the first CAPWAP control packet such that the TCP timer provides an indication of a duration of time between the first time and the second time; and
   set a retransmission time between the wireless access point and the CAPWAP controller via the CAPWAP tunnel based on the duration of time between the first time and the second time.

2. The non-transitory processor-readable medium of claim 1, wherein the response to the first CAPWAP control packet is a TCP acknowledgement signal.

3. The non-transitory processor-readable medium of claim 1, wherein the first CAPWAP control packet is formatted as a datagram message to conform to the CAPWAP protocol.

4. The non-transitory processor-readable medium of claim 1, wherein a connection between the wireless access point and a core network node is secured using a Transport Layer Security (TLS) protocol, the core network node includes the CAPWAP controller.

5. The non-transitory processor-readable medium of claim 1, wherein the first CAPWAP control packet is at least one of a session management packet, an image management packet, a statistic collection packet, or a logging packet.

6. The non-transitory processor-readable medium of claim 1, wherein the first CAPWAP control packet includes a CAPWAP header portion specific to a type of the first CAPWAP control packet and not specific to a CAPWAP binding.

7. The non-transitory processor-readable medium of claim 1, wherein the first CAPWAP control packet is a CAPWAP protocol discovery request message, the code further comprising code to cause the processor to:
   receive, in response to the CAPWAP protocol discovery request message, a CAPWAP protocol discovery response message.

8. The non-transitory processor-readable medium of claim 1, wherein the first CAPWAP control packet is a CAPWAP protocol configuration status request message, the code further comprising code to cause the processor to:
   receive, in response to the CAPWAP protocol configuration status request message a CAPWAP configuration status response message.

9. The non-transitory processor-readable medium of claim 1, further comprising code to cause the processor to:
   receive, using TCP, a response to the second CAPWAP control packet after the second time.

* * * * *